United States Patent
Halasy-Wimmer et al.

(10) Patent No.: US 6,311,808 B1
(45) Date of Patent: Nov. 6, 2001

(54) COMBINED SERVICE AND PARKING BRAKE SYSTEM

(75) Inventors: Georg Halasy-Wimmer, Markgröningen; Jürgen Balz, Hünstetten-Oberlibbach; Stefan Schmitt, Eltville; Ulrich Neumann, Rossdorf; Hans-Jörg Feigel, Rosbach; Lothar Schiel, Hofheim; Andreas Klein, Bad Homburg, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/142,363

(22) PCT Filed: Feb. 10, 1997

(86) PCT No.: PCT/EP97/00554

§ 371 Date: Feb. 11, 1999

§ 102(e) Date: Feb. 11, 1999

(87) PCT Pub. No.: WO97/29292

PCT Pub. Date: Aug. 14, 1997

(30) Foreign Application Priority Data

Feb. 9, 1996 (DE) .............................................. 196 20 344

(51) Int. Cl.[7] .................................................. F16D 55/26
(52) U.S. Cl. ...................... 188/72.6; 188/106 F; 188/68; 188/156; 188/163
(58) Field of Search .................................. 185/72.4, 72.6, 185/106 P, 106 F, 163, 156, 60, 68, 69, 361–370

(56) References Cited

U.S. PATENT DOCUMENTS

| | | |
|---|---|---|
| 2,235,412 | 3/1941 | Weiss et al. . |
| 3,482,666 | 12/1969 | Case et al. . |
| 4,215,767 | * 8/1980 | Shirey ................................... 188/265 |
| 4,487,295 | * 12/1984 | Mitchell .............................. 188/72.6 |
| 4,658,939 | * 4/1987 | Kircher et al. ...................... 188/156 |
| 5,060,765 | * 10/1991 | Meyer .................................. 188/71.9 |
| 5,148,894 | * 9/1992 | Eddy, Jr. ............................. 188/72.6 |
| 5,322,146 | * 6/1994 | Holl et al. ........................... 188/71.2 |
| 5,855,255 | * 1/1999 | Bock et al. .......................... 188/162 |
| 5,949,168 | * 9/1999 | Dieckmann et al. ............... 310/75 R |

FOREIGN PATENT DOCUMENTS

| | | |
|---|---|---|
| 820 699 | 11/1951 | (DE) . |
| 2 005 726 | 8/1971 | (DE) . |
| 3518715 | 11/1986 | (DE) . |
| 42 10 828 | 11/1992 | (DE) . |
| 42 05 590 | 8/1993 | (DE) . |
| 195 02 927 | 8/1996 | (DE) . |
| 0 140 671 | 5/1985 | (EP) . |
| 0 504 965 | 9/1992 | (EP) . |
| 2 207 718 | 2/1989 | (GB) . |
| WO92/05993 | 4/1992 | (WO) . |
| WO97/20937 | 11/1992 | (WO) . |

OTHER PUBLICATIONS

Search report of the German Patent Office Relating to Parent German Patent Application 196 20 344.9.

* cited by examiner

*Primary Examiner*—Robert Oberleitner
*Assistant Examiner*—Bruce King
(74) *Attorney, Agent, or Firm*—Rader, Fishman & Grauer PLLC

(57) ABSTRACT

The present invention relates to a combined service and parking brake system, especially for automotive vehicles, which includes a hydraulically clampable combined service and parking brake with a mechanical locking device. The mechanical locking device is electrically operable and thus satisfies in a simple fashion the parking function of the hydraulically clamped combined service and parking brake.

10 Claims, 5 Drawing Sheets

COMBINED SERVICE AND PARKING BRAKE SYSTEM

TECHNICAL FIELD

The present invention generally relates to brake systems and more particularly relates to automotive, hydraulically actuated combined service and parking brake systems.

BACKGROUND OF THE INVENTION

A combined service and parking brake system of this general type is disclosed in German patent application No. 195 02 927.5.

In this case, application of the brake in both modes of operation (service mode and parking mode) is effected hydraulically, and the brake is locked in a parking brake operation with a pressure impact which exceeds the operating pressure. The release operation of the parking brake also necessitates a pressure impact which is produced by an independent energy source. These pressure impacts above the operating brake pressure range impair the ventilating function of the sealing ring of the brake piston. Due to the high pressure the brake caliper is expanded to such an extent that a relative movement occurs during brake application between the sealing ring and the brake piston. This slip renders it impossible to the sealing ring to return the brake piston into it original position in the unloaded and unlocked condition of the brake. Disadvantageous residual torques are caused. Another disadvantage of locking and releasing the parking brake by pressure impacts which considerably exceed the operating brake pressure range, is that the brake is additionally damaged by the pressure impacts. The more the inclination of the Woehler-line flattens the worse the additional damage becomes. The result is that fatigue strength is not achieved with the reliability desired, or that the brake must be greatly reinforced (increase in weight).

Also, combined service and parking brakes are known wherein there is provision of a hydraulic actuating device for service brake operations and mechanically actuated locking devices as a parking brake. However, these arrangements suffer from the shortcoming that an additional brake cable must be provided beside the hydraulic line for each brake. This increases the expenditure in material and manufacture. Further, the brake cable cannot be mounted until the installation of the brake into the vehicle. Usually, such an assembly is not made by a particularly competent brake manufacturer but is generally carried out by car makers. Beside the disadvantage of increased assembly efforts, car makers additionally bear the risk of wrong assembly.

German published patent application No. 42 05 590 discloses a brake system where service brake operations are carried out hydraulically and parking brake operations are assisted by an electromotive adjustment means. Such an electromotive adjustment means, which takes direct effect on the position of the brake pedal, relieves the driver from the load of force application during a parking brake operation, but involves additional structural effort. This also causes additional costs.

An object of the present invention is to improve upon the prior art service and parking brake systems such that the parking brake function can be achieved easily and inexpensively while satisfying the requirements mandated by law.

According to the present invention, this object is achieved wherein the hydraulically applied wheel brake is lockable in opposition to the clamping direction of the brake by a locking device which is operable electrically. In a preferred aspect of the present invention, the mechanical locking device which is adapted to be deactivated electrically is triggered by pressure build-up in the combined service and parking brake system, with the result that the wheel brake is locked in its clamped position. For such an embodiment of the service and parking brake system, the electric deactivation of the mechanical locking device can be controlled in a service brake operation by way of the position of the brake light switch. Deactivation of the locking mechanism during service brake operations is advantageously maintained for a time after the actuation of the service brake to ensure that the wheel brakes are totally released.

In a preferred and simple aspect of the present invention, the locking device is a mechanical catch mechanism which acts unilaterally, permits movement in the clamping direction of the wheel brake and prevents movement in the opposite direction.

A catch mechanism of this type may have a form-lock design, in the form of a rail with a saw-tooth snap-in configuration and an associated pawl, or may be a frictional means in the form of two rails, movable parallel to each other, with a wedge-shaped interspace and a stop element in this wedge-shaped interspace which produces a clamping effect when the rails move in the locking direction.

In order to satisfy legal requirements demanding a second actuating travel for the parking brake, the parking brake is hydraulically actuated either by muscle power of the driver by way of a braking pressure generator (for example, second brake pedal, lever) which is independent of the operating system and adapted to be operated by hand or foot, or by an independent energy actuating mechanism. It is necessary for both types of actuation that the parking brake can be released and adjusted by the driver.

Actuation of the parking brake by independent energy may be effected in a variety of different manners. Such actuation appropriately makes use of electrically drivable energy sources (such as booster, hydraulic pump, plunger drive, accumulator with electric valves) which are already provided in the brake system. It is favorable that the independent energy source acts upon two hydraulic brake circuits, isolated from each other, in order to render possible an emergency parking brake operation in the event of failure of one brake circuit. Should both the operating brake pressure generator and the independent energy source act by way of a brake circuit upon the wheel brakes with locking device, upon failure of this brake circuit, the ABS/TCS valves of the other brake circuit can be used for an emergency parking brake function to enclose the brake fluid quantity.

Controlled delivery of the parking brake force in the case of an actuation by independent energy may occur in a favorable manner by way of the activity period of an electric switch. On the other hand, controlled brake force delivery is also possible by the direct digital or analog input of the desired braking pressure intensity.

In another preferred aspect of the present invention, the mechanical locking device has an emergency lever which permits deactivating the locking device by way of tool means. Appropriately, an emergency lever of this type is directly connected mechanically to the unilaterally acting catch mechanism of the wheel brake and thus provides emergency release of the brake.

In still another preferred aspect of the present invention, the clamped piston position is locked mechanically by means of an automatic, infinitely variable adjusting device. The mechanical locking mechanism is activated electromagnetically by an electric circuit which is operable independently by an electric switch. This permits using the parking brake in the regular operating brake pressure range which obviates the need for independent energy sources that require a pump or an accumulator, for example.

In a favorable embodiment of the present invention, the adjusting device includes an adjusting nut and an adjusting spindle with a motional thread which is particularly positioned in the interior of the brake piston. Expediently, the friction clutch is provided by the adjusting nut and a friction cone accommodated in the brake housing.

In further advantageous embodiments, the electromagnet is arranged in the brake housing, and the armature of the electromagnet is rigidly connected to the adjusting nut.

Further, it has proved to be suitable that the winding of the electromagnet is incorporated in a cylindrical extension of the brake housing cover and the friction cone is provided on the cylindrical extension of the brake housing cover.

Advantageously, the adjusting nut has two axial bearings for positioning. One of the bearings is supported on the brake housing by way of a spring.

To prevent release of the parking brake by inadvertent depression of the brake pedal, an electric relay is disclosed in preferred embodiments. When the electromagnet is activated, the relay is operated so that the electromagnet is closed upon actuation of the brake light switch. Or, when the electromagnet is activated, the relay is operated so that actuation of the brake light switch causes energization of a normally open valve which isolates the parking brake from the hydraulic pressure supply. Another embodiment provides for this purpose for an alternating switch which, in its on-condition, energizes the electromagnet/the normally open valve when the brake light switch is operated.

DETAILED DESCRIPTION OF THE PREFERRED EMBODIMENTS

Figure 1:
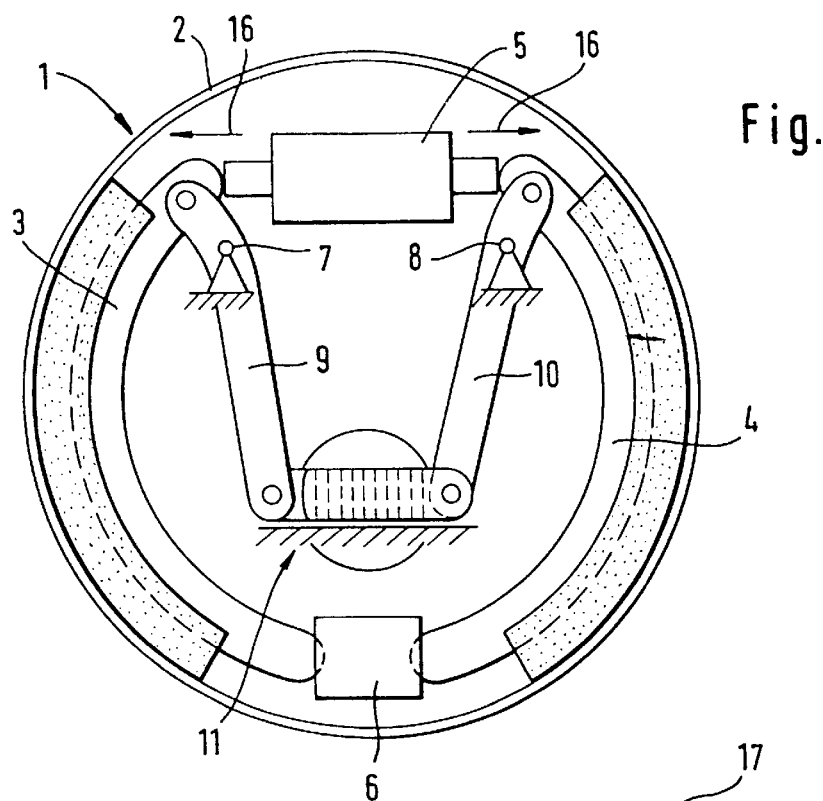
FIG. 1 is a side view of a drum brake with a mechanical locking device.
Figure 2:
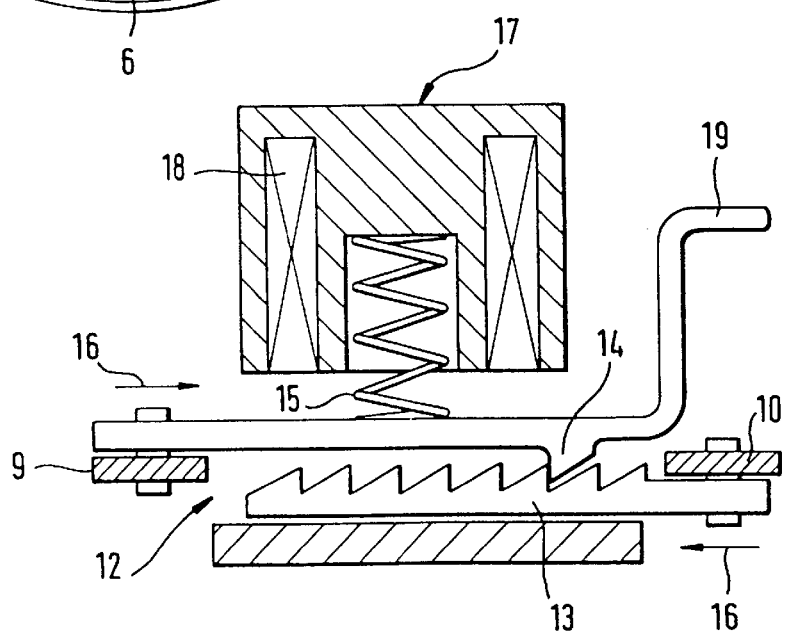
FIG. 2 is an enlarged partial view of a mechanical locking device of the drum brake of FIG. 1.

The Simplex drum brake 1 shown in FIGS. 1 and 2 has two brake shoes 3, 4 arranged in a brake drum 2 which are adapted to be urged to press on the brake drum 2 by a wheel brake cylinder 5 acted upon by hydraulic pressure in a braking operation. The brake shoes 3, 4 on one end are adapted to be swiveled about an abutment surface of a pressure member 6 and are expandable on a second end by the wheel brake cylinder 5. At this second end, the brake shoes 3, 4 are connected swivelably to a lever 9, 10 pivoted about a fixed fulcrum 7, 8. Lever 9, 10, in turn, is articulated at a mechanical locking device 11. The mechanical locking device 11 in the FIG. 2 embodiment is configured as a unilaterally acting mechanical catch mechanism 12 which includes a rail with a saw-tooth snap-in configuration 13 and an associated pawl 14. The connection between rail 13 and pawl 14 with the levers 9, 10 permits transmitting the approaching movement of the brake shoes 3, 4 towards the catch mechanism 12 by way of an appropriate transmission ratio. The pawl 14 biased by a stationarily supported spring 15 engages into the saw-tooth snap-in configuration of rail 13 and permits a relative movement of rail 13 and pawl 14 only in the clamping direction 16 of the brake shoes 3, 4. The catch mechanism 12 is locked in the opposite direction. This prevents release of the hydraulically clamped drum brake 1. Further, the pawl 14 of the catch mechanism 12 can be actuated electrically by way of an electric unit 17 with winding 18. When winding 18 is excited, pawl 14 in FIG. 2 is moved upwards and disengaged from the saw-tooth snap-in configuration of rail 13, with the result of deactivation of the catch mechanism 12. The mechanical catch mechanism 12 is deactivated during each service brake operation and remains deactivated for a time t after the application of the brake pedal to ensure that the wheel brakes with a mechanical locking mechanism have been entirely released. This can be achieved in a simple fashion by activating the electric unit 17 by way of the position of the brake light switch. In a parking brake operation, the catch mechanism 12 remains activated and locks the wheel brake 1 in the hydraulically clamped condition. The parking brake is released as soon as the mechanical catch mechanism 12 is deactivated and the hydraulic actuation of the brake occurs at a slightly higher value than is the case when the parking brake is released. This permits removing the locking engagement by applying little force at the catch mechanism 12.

In addition, the catch mechanism 12 includes an emergency lever 19 which will cause disengagement of rail 13 and pawl 14 and thus remove the locking engagement by tool means in the case of a malfunction of the electric energy supply. An emergency lever 19 for emergency release can be actuated both mechanically and electrically. An electric actuation requires a second electric energy source.

To satisfy legal requirements demanding a second actuating travel of the parking brake, the parking brake must be clamped hydraulically by way of a second braking pressure generator (for example, second brake pedal, lever), which is operable by hand or foot by the muscle power of the driver, or by an independent energy actuating mechanism which can be triggered and adjusted by the driver.

By way of actuating an electric switch or switching off the ignition, the driver indicates to an electronic circuit that the parking brake be activated. The electronic circuit controls the current supply to the electric unit 17 of the catch mechanism 12. When actuated by muscle power, the clamping force of the parking brake is adjusted by varying the actuating force on the second braking pressure generator. When actuated by a switch, brake adjustment is by way of the activity duration (integration as a function of time) or the direct digital or analog input of the desired braking pressure intensity for parking brake operations.

Figure 3:
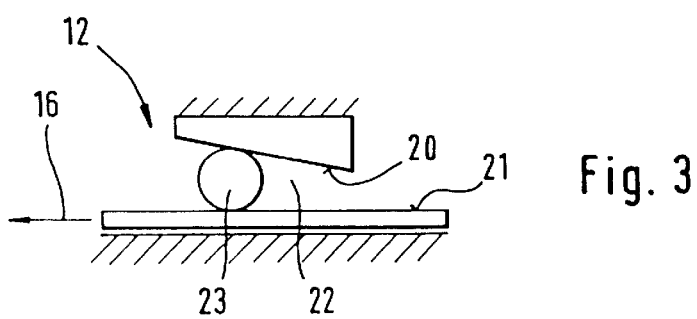
FIG. 3 is a diagram view of a catch mechanism with frictional locking engagement.

Similar to the design of a form-locking, mechanical catch mechanism 12 with a unilaterally acting catch mechanism, the use of a frictional mechanical catch mechanism as in FIG. 3 is also possible. The latter catch mechanism has two opposite surfaces 20, 21 with a wedge-shaped interspace 22 in which a cylindrical locking member 23 is arranged which permits a parallel displacement of the two surfaces 20, 21 relative to one another only in the clamping direction 16 of the brake. In the opposite direction, the cylindrical locking member 23 is moved into the wedge-shaped tapering interspace 22 and causes a frictional clamping engagement of the catch mechanism 12.

Figure 4:
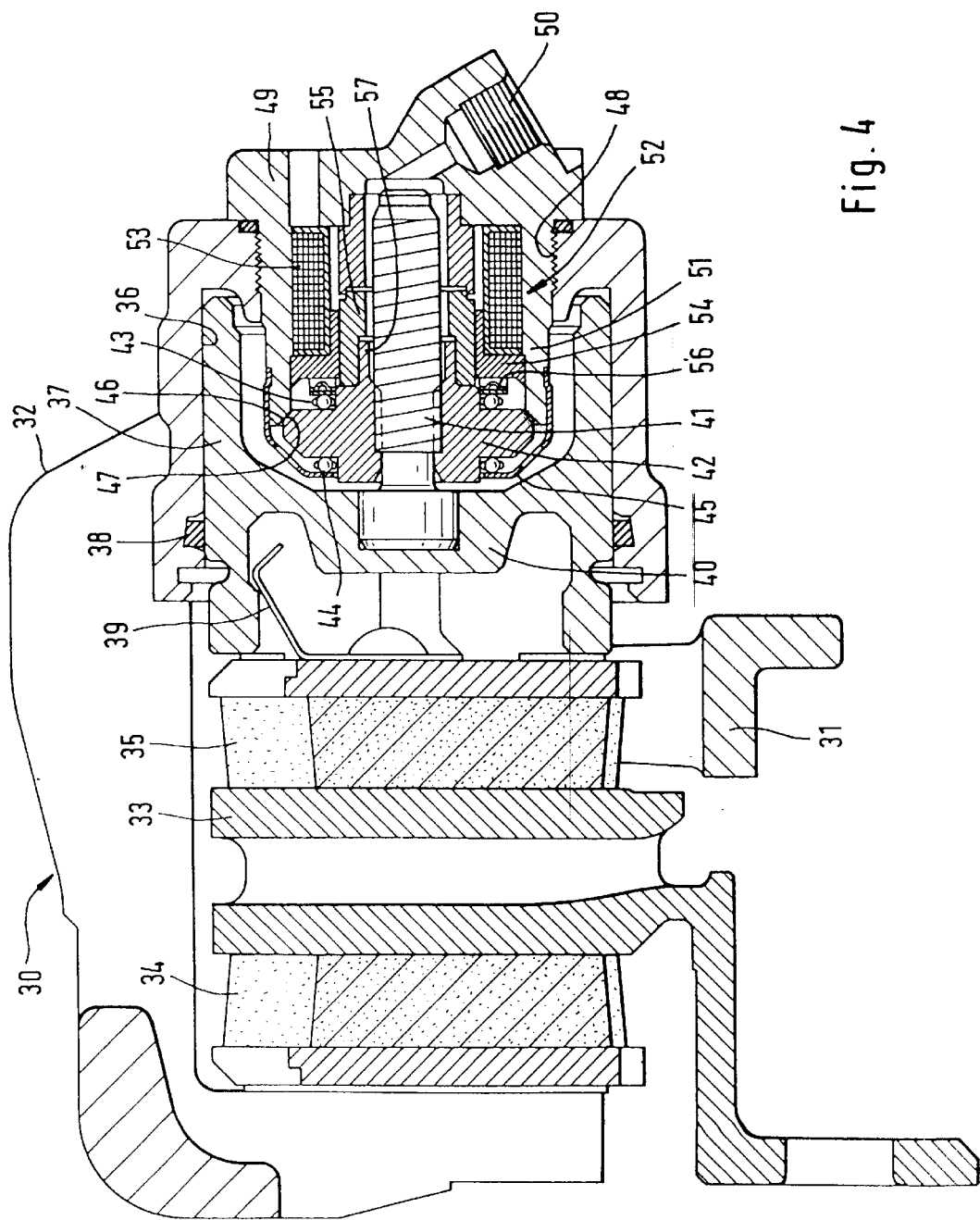
FIG. 4 is a cross-sectional view of a combined service and parking brake for automotive vehicles (spot-type disc brake).

The combined service and parking brake 30 shown in the FIG. 4 embodiment includes a brake carrier 31 and a brake housing 32 which straddles the external edge of a brake disc 33 and two brake linings 34, 35 arranged on either side of the brake disc 33. The brake housing 32 forms on its inside a brake cylinder 36 which accommodates an axially slidable brake piston 37. Brake fluid can be introduced into the chamber formed between the brake cylinder 36 and the brake piston 37 so that braking pressure develops which displaces the brake piston 37 axially towards the brake disc 33. This urges the brake lining 35 to press on the brake disc 33, with the reaction that the brake housing 32 displaces in the opposite direction and thereby also presses the brake lining 34 against the brake disc 33.

A sealing ring 38 is interposed between the brake piston 37 and the brake cylinder 36 and slightly retracts the brake piston 37 when braking has been effected (roll-back seal). The brake lining 35 connected to the brake piston 37 by way of the lining-holding spring 39 is thus entrained. The adjusting device has a threaded spindle 41 which is rigidly connected to the bottom 40 of the brake piston 37, extends axially away from the brake disc 33 and carries an adjusting nut 42. Axial bearings 43, 44 are arranged on corresponding steps of the adjusting nut 42 on either side of the adjusting nut 42. Towards the brake disc 33, the adjusting nut 42 is retained by a retaining element 45 which is rigidly connected to the brake housing 32. Element 45 outwardly embraces the adjusting nut 42 and the axial bearing 44.

A cone coupling is provided by a conical friction surface 46, formed outwardly on the adjusting nut 42, and a friction surface 47 fixed to the housing.

The brake housing 32 has a threaded opening 48 which is closed by means of a screwed housing cover 49. Supply bore 50 for the brake fluid is provided in the housing cover 49. Further, the housing cover 49 has a cylindrical extension 51 which extends into the interior of the brake cylinder 36. The cylindrical extension 51 at its front end forms the friction surface fixed to the housing. On the outside of the extension, the retaining element 45 is fastened.

Electromagnet 52 is arranged inside the cylindrical extension 51. Winding 53 is mounted between the bottom surface of the housing cover 49 and the armature guide 54 and is fixed against an axial movement. Armature 55 of the electromagnet 52 is rigidly connected to a cylindrical extension 57 of the adjusting nut 42.

The operation of the combined service and parking brake is described in the following. In the service brake actuating mode, the brake piston 37 is urged by hydraulic pressure to press on the brake linings 34, 35 as in any standard disc brake. The adjusting nut 42 performs a rotation due to the displacement of the adjusting spindle 41. The adjusting nut 42 is positioned by the two axial ball bearings 43, 44. The piston-side bearing 44 which is loaded in the clamping operation is directly supported on the housing. The rear bearing 43 which is loaded during release of the brake is supported on the housing by way of a compression spring 56.

In the parking brake actuating mode, exactly as in the service brake actuating mode, the brake piston 37 is urged by hydraulic pressure to press on the brake linings 34, 35, and clamping force is generated. When the necessary clamping force is reached, the driver actuates a switch whereby the electromagnet 52 is activated. The electromagnet 52 draws the adjusting nut 42 in opposition to the compression spring 56 of the rear axial bearing 43 against the friction surface of the cone clutch fixed to the housing. The result is activation of the friction clutch. Reduction of the hydraulic pressure initially causes a compensation of the mechanical clearance between the adjusting spindle and the adjusting nut, with the result of a small loss in bias. Thereafter, axial displacement of the brake piston 37 with further reduction of the hydraulic pressure is not possible. Axial displacement of the brake piston 37 by way of the adjusting spindle 41 always causes rotation of the adjusting nut 42. However, this rotation is changed by the engaged cone coupling. The brake piston 37 is supported on the brake housing by way of the adjusting spindle 41 and the adjusting nut 42, with the result that the parking position is locked.

Hydraulic pressure corresponding to the clamping force is generated to release the parking brake. The cone clutch is thereby relieved from load, and the biased compression spring 56 of the rear axial bearing 43 displaces the adjusting nut 42 to the front. This opens the friction clutch. Because the spring force exceeds the friction forces in the motional thread, the brake piston 37 can return to its original unloaded inactive position, with the adjusting nut 42 rotating. A proper clearance function is given by using low pressures. The compression spring 56 maintains the adjusting nut 42 in this disengaged position, and the service brake actuating mode is initiated until the next activation of the electromagnet.

There are various appropriate solutions to prevent release of the parking brake by inadvertent application of the brake pedal. In a first embodiment, an electric relay is activated after activation of the electromagnet, triggering the energization of the electromagnet when the brake light switch is actuated. This causes permanent engagement of the friction clutch. Exceeding of the prevailing hydraulic pressure causes increase of the clamping force of the parking brake. However, the engaged friction clutch prevents a decline of the clamping force when the hydraulic pressure is reduced.

In another variation, activation of the electromagnet causes actuation of an electric relay so that a normally-open valve is energized when the brake light switch is actuated. In its closed condition, the valve disconnects the parking brake from the hydraulic pressure supply.

In another embodiment, the electric relays described here and above may be replaced by an alternating switch which, when activated, energizes the magnet/the normally-open valve when the brake light switch is activated. The result is that the clamping force may only be increased but not reduced in the parking brake actuating mode upon application of the brake pedal.

Figure 5:
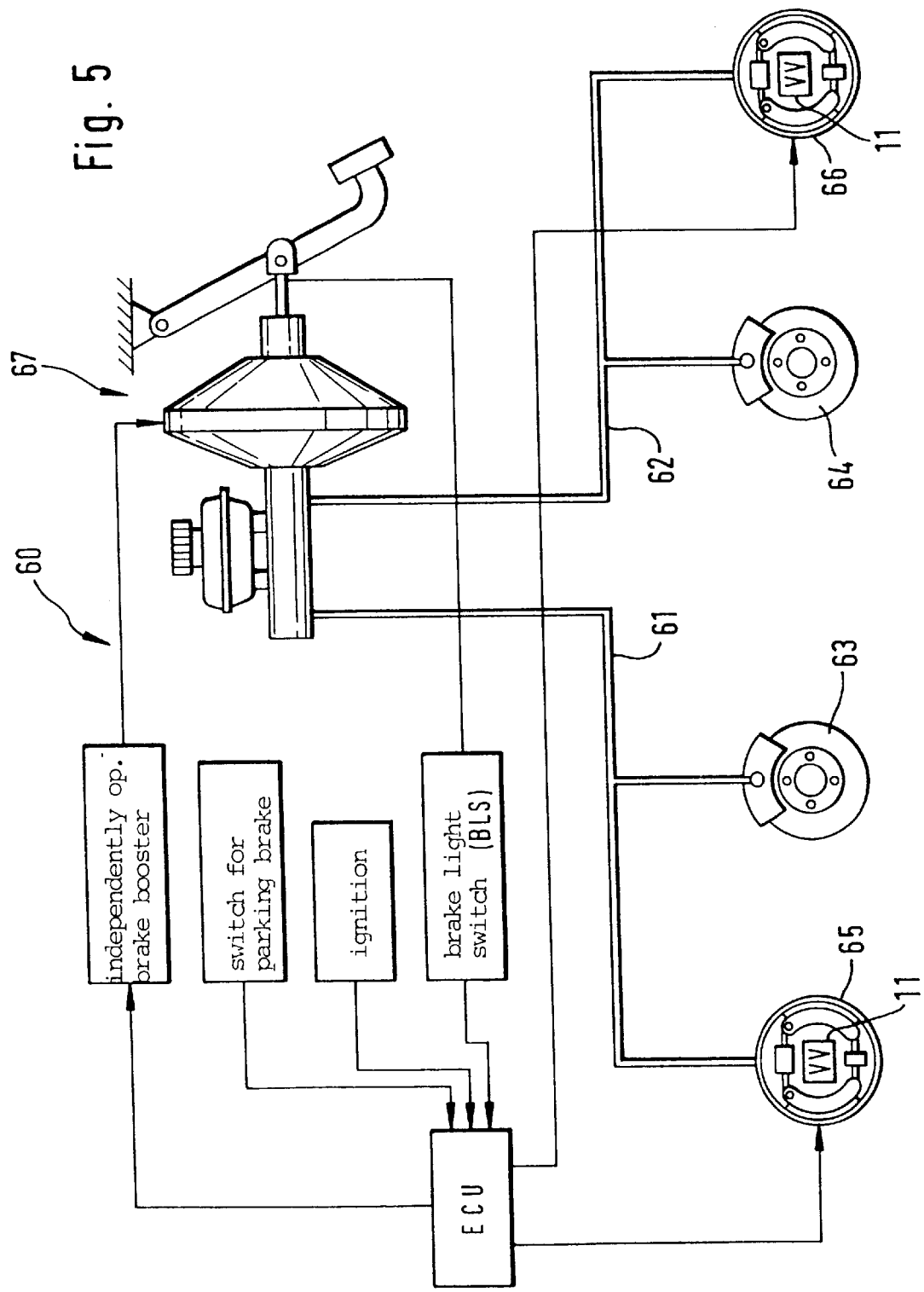
FIG. 5 is a view of a combined service and parking brake system with actuation of the parking brake by independent energy by way of an independently controlled brake power booster.
Figure 6:
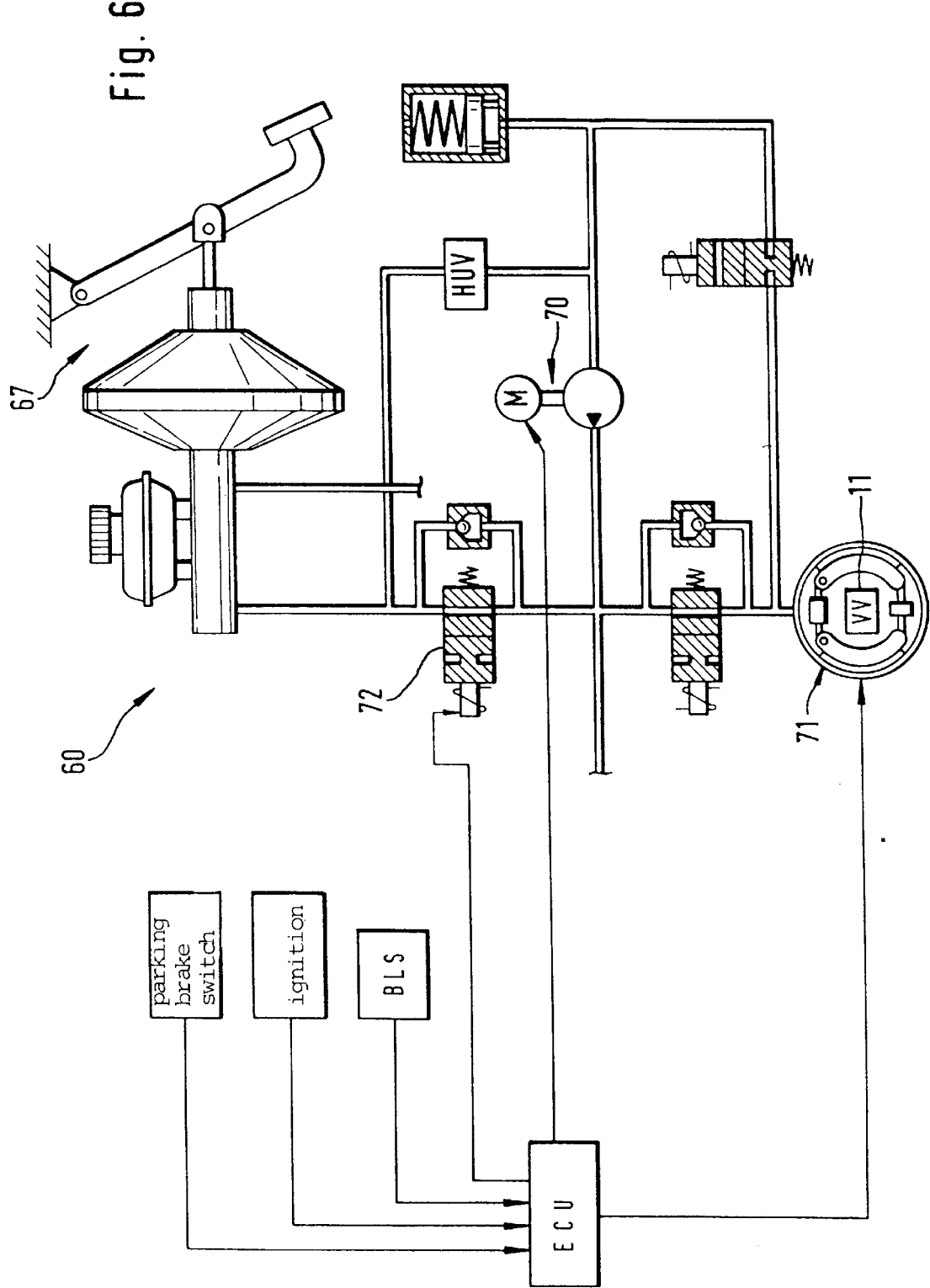
FIG. 6 is a partial view of a combined service and parking brake system with actuation of the parking brake by independent energy by way of a TCS pump.
Figure 7:
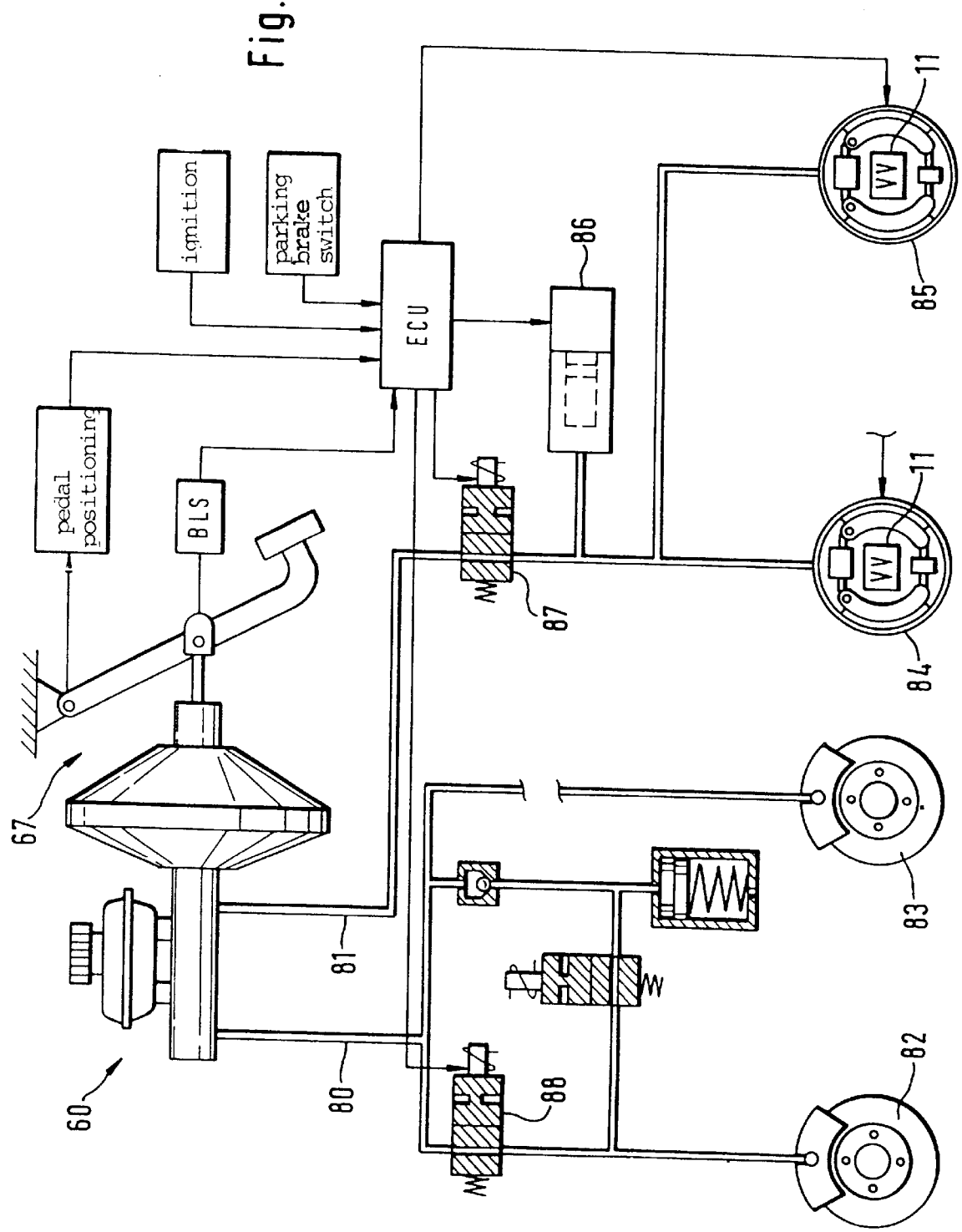
FIG. 7 is a view of a combined service and parking brake system with a parking brake actuated by independent energy by way of an electrically driven plunger.

The embodiments of FIGS. 5 to 7 show diagram views of embodiments of a combined service and parking brake system, wherein an electrically controlled and adjustable independent energy source is used for the hydraulic pressure build-up of the parking brake.

The combined service and parking brake system 60 shown in FIG. 5 includes two isolated hydraulic brake circuits 61, 62 in a diagonal circuit split-up design. Each brake circuit 61, 62 is hydraulically connected to a front-wheel disc brake 63, 64 and a rear-wheel drum brake 65, 66. The rear-wheel drum brake 65, 66 is a combined service and parking brake with an electrically actuated, mechanical locking device (VV) 11 of the type described here and above, for example. In a service brake operation, the hydraulic pressure increase is effected by way of an actuating unit 67 directly operated by the driver. Unit 67 is composed of foot pedal, brake force booster, master brake cylinder and supply reservoir for the pressure fluid. Further, the electronic control unit (ECU) which, among others, monitors the position of the brake light switch (BLS) during each service brake operation sends an electric signal to the mechanical locking device 11. The electric signal deactivates the locking device 11 during service brake operations.

A parking brake operation is performed by using an electrically independently controlled and adjustable brake force booster (BKV) (for example, brake assistant, Smart Booster, electric booster, electrohydraulic booster) which acts centrally upon both brake circuits 61, 62 by way of the actuating unit 67. The parking brake is triggered and adjusted by the driver by a parking brake switch (FSB switch) which sends an input signal to the electronic control unit ECU. The ECU electrically doses the hydraulic clamping force of the parking brake by way of the independently controlled brake force booster. Further, the ECU activates the locking device 11 of the rear-wheel drum brake 65, 66 by electric signals. This locks the clamped brake mechanically. Similarly, the parking brake can be triggered by a signal of an electric circuit which is linked to the ignition so that the rear-wheel drum brake 65, 66 is applied and locked when the ignition is turned off. Further, the diagonal split-up of the brake circuits 61, 62 permits an emergency parking brake operation even if one of the two brake circuits 61, 62 fails.

The embodiment of FIG. 6 illustrates the section of a combined service and parking brake system with ABS according to the recirculation principle. The basic mode of operation of service brake and parking brake is virtually identical with the brake system shown in FIG. 5. An electrically independently actuatable hydraulic pump 70 (e.g., TCS pump) is used as an independent energy actuating mechanism In parking brake operations, the hydraulic pump 70, similarly to the independently actuated brake force booster in FIG. 5, is actuated by the ECU and aspirates for independent pressure increase in the drum brake 71 pressure fluid from the supply reservoir by way of a hydraulically actuated change-over valve HUV (TCS valve) and the master cylinder. The pressure fluid is delivered to the combined drum brake 71 with an electrically operable locking device 11. In parallel thereto, the ECU electrically activates the locking device 11, and energizes and thereby closes a normally-open valve 72 in order to prevent return flow of the pressure fluid into the supply reservoir. In the dual-circuit brake system of the FIG. 6 embodiment, the hydraulic pump 70 is used individually for each circuit for the build-up of independent pressure in parking brake operations. It is also possible to use the hydraulic pump for the build-up of independent pressure in parking brake operations centrally in both brake circuits.

The FIG. 7 embodiment shows a combined service and parking brake system 60 which includes an ABS and two isolated brake circuits 80, 81 in a black-and-white circuit split-up. The first brake circuit 80 is connected hydraulically to the front-wheel disc brakes 82, 83 and the second brake circuit 81 is connected hydraulically to the rear-wheel drum brakes 84, 85 which, in the capacity of combined service and parking brakes, are equipped with an electrically operable, mechanical locking device 11. The service brake and parking brake is triggered and operated generally similar to the above-described brake systems. As an independent energy source an electrically actuated plunger 86 is used, which is mounted in the rear-axle brake circuit 81 of the brake system for ABS control. Of course, it is also possible to use instead of the plunger 86 an accumulator, not shown,(for example, spring accumulator gas accumulator) which is controlled by electric valves. Plunger or accumulator may be used for the independent pressure build-up individually for each wheel or circuit. During parking brake operations, the plunger 86 is adjusted by the ECU, electrically actuated, and causes hydraulic independent pressure build-up in the combined rear-wheel drum brakes 84, 85. Further, the ECU closes a normally-open valve 87 in order to prevent pressure fluid return flow into the supply reservoir, and activates the locking devices 11 in the rear-wheel drum brakes 84, 85. In order to ensure an emergency parking brake operation upon malfunction of the rear-axle brake circuit 81, a normally-open valve 88 without non-return valve is provided for each wheel in the front-wheel brake circuit 80. For the emergency parking brake operation, hydraulic pressure is applied to the front-wheel brake circuit 80 by way of the actuating unit 67, and the clamped front-wheel disc brakes 82, 83 are disconnected from the front-wheel brake circuit 80 by the energized, closed normally-open valve 88. The front-wheel brakes are locked hydraulically.

In addition, the brake system in the FIG. 7 embodiment has a sensor which monitors the pedal positioning and informs the ECU accordingly so that the electronics recognizes when the brake pedal application is changed during ABS control.

Beside the embodiments explained here and above, further combined service and parking brake systems are still possible which use electrically and independently actuated independent energy sources for parking brake operations.

What is claimed is:

1. Combined service and parking brake system, comprising:
    at least one hydraulically clampable combined service and parking brake,
    means for locking the combined service and parking brake, in opposition to a clamping direction, wherein said locking means is electrically operable, wherein the combined service and parking brake has an adjusting device with a mechanical catch mechanism, including a friction clutch, and in that an electromagnet is provided by which the catch mechanism of the adjusting device is operable, wherein the adjusting device includes an adjusting spindle and an adjusting nut with a motional thread which are arranged in the interior of the brake piston, wherein the armature of the electromagnet is rigidly coupled to the adjusting nut.

2. Combined service and parking brake system as claimed in claim 1, wherein the friction clutch is provided by the adjusting nut and a friction cone.

3. Combined service and parking brake system as claimed in claim 1, wherein the winding of the electromagnet is arranged in a cylindrical extension.

4. Combined service and parking brake system as claimed in claim 2, wherein the friction cone is provided on a cylindrical extension of a brake housing cover.

5. Combined service and parking brake system as claimed in claim 1, wherein the adjusting nut has two axial bearings.

6. Combined service and parking brake system as claimed in claim 1, further including an electric relay which, upon activation of the electromagnet, triggers closing of the electromagnet when a brake light switch is operated.

7. Combined service and parking brake system as claimed in claim 1, further including an electric relay, wherein said combined service and parking brake further includes a parking brake coupled to a hydraulic pressure device, wherein said electric relay, upon activation of the electromagnet, triggers energization of a normally-open valve when a brake light switch is operated, which valve isolates the parking brake from the hydraulic pressure device.

8. Combined service and parking brake system as claimed in claim 1, further including an alternating switch which, in its on-condition when a brake light switch is operated, energizes the electromagnet or the normally open valve when the brake light switch is switched on.

9. Combined services and parking brake system, comprising:

at least one hydraulically clampable combined service and parking brake, means for locking the combined service and parking brake, in opposition to a clamping direction of the brake, wherein said locking means is electrically operable, wherein the combined service and parking brake has an adjusting device with a mechanical catch mechanism, including a friction clutch, and in that an electromagnet is provided by which the catch mechanism of the adjusting device is operable, further including an electric relay, wherein said combined service and parking brake further includes a parking brake coupled to a hydraulic pressure device, wherein said electric relay, upon activation of the electromagnet, triggers energization of a normally-open valve when a brake light switch is operated, which valve isolates the parking brake from the hydraulic pressure device.

10. Combined services and parking brake system, comprising:

at least one hydraulically clampable combined service and parking brake, means for locking the combined service and parking brake, in opposition to a clamping direction of the brake, wherein said locking means is electrically operable, wherein the combined service and parking brake has an adjusting device with a mechanical catch mechanism, including a friction clutch, and in that an electromagnet is provided by which the catch mechanism of the adjusting device is operable, further including an alternating switch which, in its on-condition when a brake light switch is operated, energizes the electromagnet or the normally open valve when the brake light switch is switched on.

* * * * *